Feb. 23, 1965     C. G. KATZENBERGER     3,170,531
CONVERTIBLE TRACTOR
Filed May 24, 1960     2 Sheets-Sheet 1
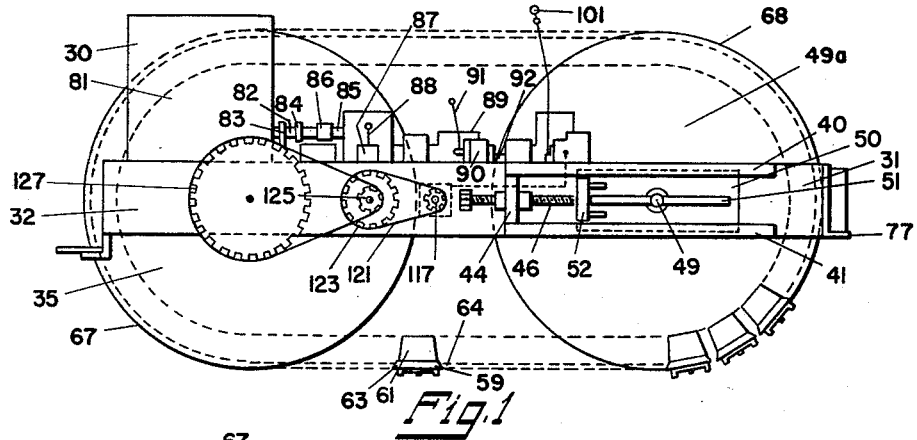
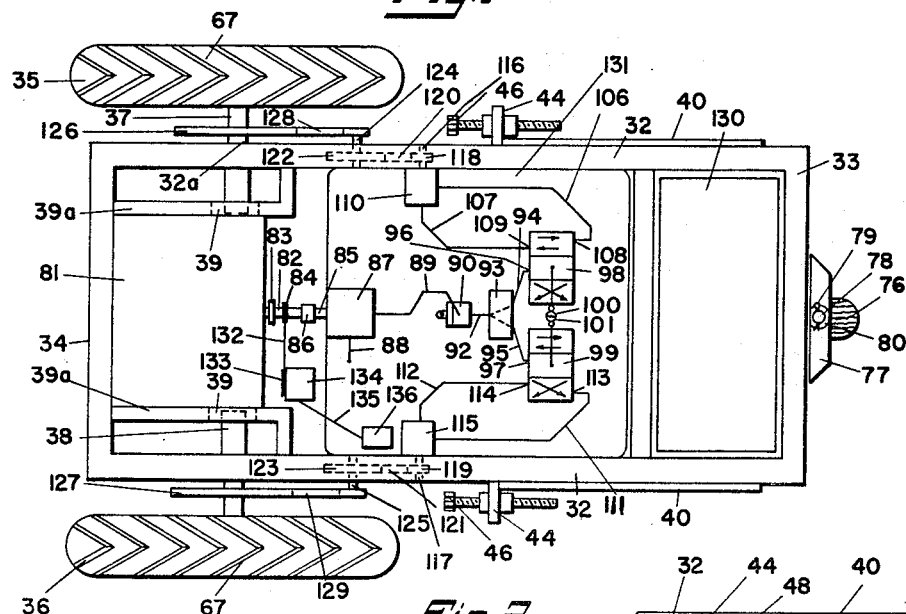
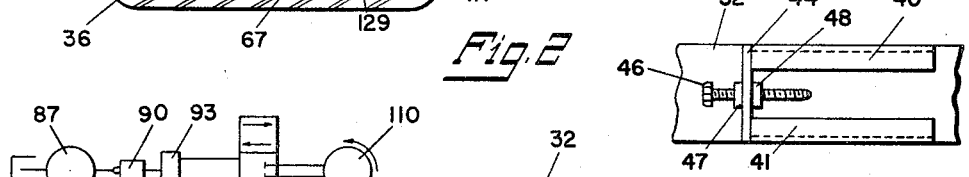
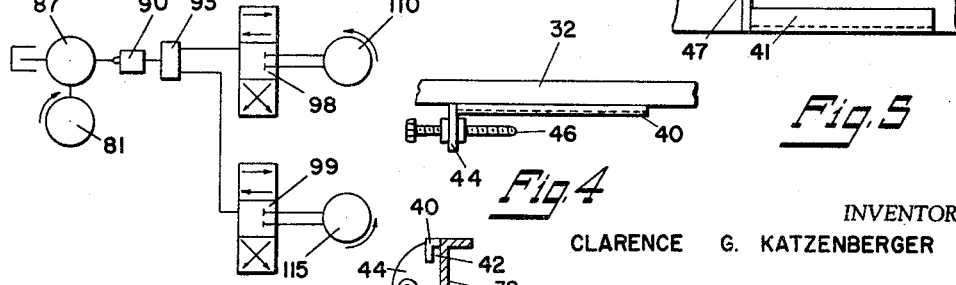
INVENTOR
CLARENCE G. KATZENBERGER
BY Joseph G. Werner
ATTORNEY Feb. 23, 1965   C. G. KATZENBERGER   3,170,531
CONVERTIBLE TRACTOR
Filed May 24, 1960   2 Sheets-Sheet 2
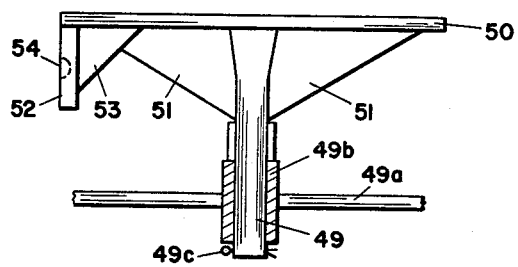
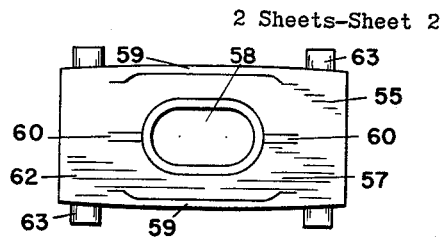
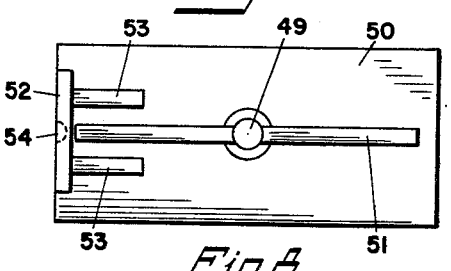
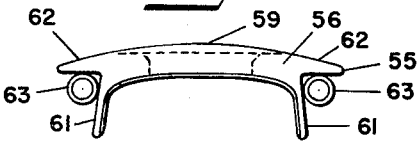
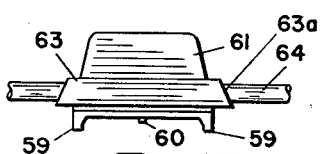
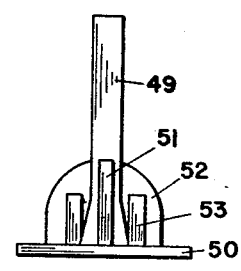
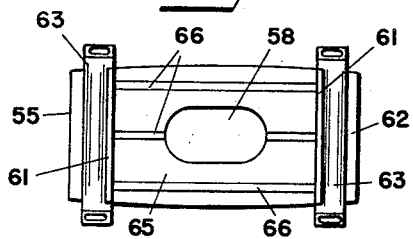
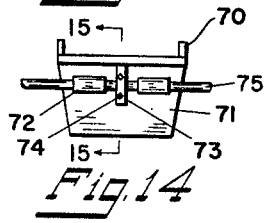
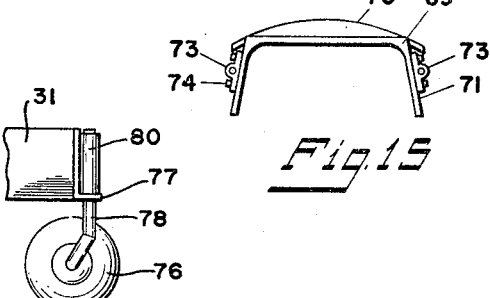
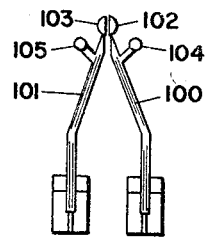
INVENTOR
CLARENCE G. KATZENBERGER
BY Joseph G. Warner
ATTORNEY

United States Patent Office 3,170,531
Patented Feb. 23, 1965

3,170,531
CONVERTIBLE TRACTOR
Clarence G. Katzenberger, Rte. 1, Middleton, Wis.
Filed May 24, 1960, Ser. No. 31,368
4 Claims. (Cl. 180—9.2)

This invention relates to a convertible tractor, and more particularly to a tractor which may be converted from a tractor of the endless track type to a three-wheel tractor, and vice versa.

An object of the invention is to provide a tractor which can be readily converted from an endless track type to a three-wheel tractor, and vice-versa, with a minimum of effort and by the removal or addition of only a few parts.

Another object of the invention is to provide a tractor which can be turned sharply within a radius less than its wheelbase both as an endless track tractor and as a three-wheel tractor.

A further object of the invention is to provide ease and smoothness of operation by hydraulic operation of the tractor and accessories therefor.

An additional object of the invention is to provide dual control of the tractor driving wheels with a single motor.

A still further object of the invention is to provide a novel endless track designed for use with wheels having rubber tires, and which can be easily intalled or removed.

Another object of the invention is to provide an endless track tractor whose wheel base may be readily lengthened or shortened whereby to increase the versatility and flexibility of the tractor.

Other and further objects and advantages of the invention will be obvious from the following description and the drawings wherein:

FIG. 1 is a side view of my tractor showing the endless track on the wheels of the far side, the wheels of the near side not shown.

FIG. 2 is a top diagrammatic view of my tractor with the tricycle front wheel, showing the hydraulic lines.

FIG. 3 is another schematic view of the motor and hydraulic system for the tractor.

FIG. 4 is a top view of the set screw arrangement for retaining the axles of the front caterpillar wheels in position.

FIG. 5 is a side view of the same set screw arrangement.

FIG. 6 is a forward view of the set screw arrangement as secured to the frame of the tractor.

FIG. 7 is a top view of an axle for a front endless track wheel and the base member therefor, with a partial cross-sectional view of the wheel mounted thereon.

FIG. 8 is a side view of the same axle and base member.

FIG. 9 is a front view of the same axle and base member.

FIG. 10 is an outside view of an endless track cleat.

FIG. 11 is a front view of the endless track cleat.

FIG. 12 is a side view of the endless track cleat showing the track cable extending therethrough.

FIG. 13 is an inside view of the endless track cleat.

FIG. 14 is a side view of a modified form of the endless track cleat.

FIG. 15 is a front view of the modified form of the endless track cleat at the line 15—15 of FIG. 14.

FIG. 16 is a rear view of the master dual control levers for the tractor.

FIG. 17 is a cutaway side view of the front end of my tractor with the tricycle front wheel.

My tractor 30 has frame 31 having frame sides 32, front end 33 and rear end 34. Rear wheels 35 and 36 have axles 37 and 38 which are supported by bearings 32a extending through frame sides 32 and bearing holders 39 secured to supports 39a. Angle irons 40 and 41 shown in FIG. 6 are secured to each of frame sides 32 to provide slots 42 and 43. Plate 44, having threaded aperture 45 is secured to frame sides 32 and the rear ends of angle irons 40 and 41. Threaded set screw or bolt 46 extends through nuts 47 and 48 and intervening aperture 45 of plate 44.

Front wheel axles 49 for front wheels 49a are secured to axle plates 50 and supported by support webs 51. Push plate 52 having support members 53 is perpendicularly secured to axle plate 50. Push plate 52 may have a slight indent 54. Front wheels 49a are mounted on front axles 49 with bearings 49b and pin 49c.

An endless track cleat 55 has a strong body portion 56 with an outer surface 57 and preferably an aperture 58. Cleat 55 also has outwardly extending sloped ridges 59 and 60. Tire guides 61 extending inwardly from the body portion 56. Wings 62 extend laterally from body portion 56. Cable holders 63 with bevelled ends 63a are secured to the inner side of wings 62 and the outer side of tire holders 61. Cable 64 is strung through cable holders 63 and the ends of the cable spliced together to make an endless track as shown in FIG. 1. The inner surface 65 of tread 55 has ridged portions 66 to provide greater friction between the tread and the rear tires 67 and front tires 68.

FIGS. 14 and 15 show a slightly modified form of a cleat 69 with sloped ridges 70 and tire guides 71. Cable holders 72 and clips 73 held in position by bolts 74 fasten cable 75 to cleat 69.

When the front wheels 49a and endless tracks 55 are removed smaller tricycle wheel 76 may be swivelly attached to forwardly extending portion 77 of frame 31 by rod 78 and cotter key 79 through bearing 80.

A conventional gasoline motor 81 has motor shaft 82 which carries mechanical power take-off 83 and hydraulic power take-off 84 and is connected to hydraulic pump shaft 85 by coupling 86. Hydraulic pump shaft 85 is connected to master hydraulic pump 87 which has control handle 88. Hydraulic fluid tubing 89 connects master pump 87 and fluid speed control 90 which has control lever 91. Fluid tubing 92 extends between fluid speed control 90 and fluid divider 93 from which fluid tubing 94 and 95 extend to pump ports 96 and 97 of fluid pumps 98 and 99, respectively. Fluid pumps 98 and 99 are controlled by dual master controls 100 and 101, respectively, with respective main handles 102 and 103 and side handles 104 and 105. Fluid tubing 106 and 107 respectively, extend from valves 108 and 109 of pump 98 to fluid motor 110, and fluid tubing 111 and 112, respectively, extend from valves 113 and 114 of pump 99 to fluid motor 115. Fluid motors 110 and 115 respectively rotate shafts 116 and 117 to which gear wheels 118 and 119 are respectively secured. Chains 120 and 121 respectively connect gear wheels 118 and 119 to gear wheels 122 and 123, which are respectively secured to gear shafts 124 and 125. Gear shafts 124 and 125 are rotatably connected with frame sides 32. Gear wheels 122 and 123 and gear wheels 126 and 127 respectively carry endless chains 128 and 129. Gear wheels 126 and 127 are respectively secured to axles 37 and 38. Fuel tank 130 carries fuel for motor 81, and tank 131 carries fluid for the hydraulic system.

In order to convert the tractor from the three-wheel type shown in FIG. 2 to the endless track type shown in FIG. 1, the operator proceeds as follows:

Axle plates 50 are fitted into slots 42 and 43 with front wheel axles 49 extending outwardly from the tractor. Threaded set screws 46 are positioned so as to be in retracted position. Axle plates 50 slide rearwardly in slots 42 and 43 until indent 54 of push plate 52 is in contact with the forward end of set screw 46.

Front wheels 49a with bearings 49b are then placed on front wheel axles 49 and are secured thereon by pin 49c or other appropriate means. The endless tracks for each side, consisting of numerous cleats 55 joined by cables 64, are then placed over both rear tire 67 and front tire 68 respectively. This operation may best be performed by raising one side of the tractor at a time so that the wheels on one side are off the ground when the endless track is placed over the front and rear wheels. Set screw 46 is then turned forwardly against push plate 52. As set screw 46 moves forward, push plate 52, carrying front wheel axles 49 and front wheels 49a, is also moved forward. The endless track is tightened as the front wheels are extended forward until the track becomes relatively taut as it extends from rear wheel to front wheel.

The small front tricycle wheel is then removed from the tractor by withdrawal of pin 79 and removal of rod 78, from bearing 80.

Substitution of the front tricycle wheel as shown in FIG. 2 for the endless tracks is performed in the reverse order of that above described.

The endless track cleats 55 are especially made for use over rubber tires. Tire guides 61 retain the cleats in lateral position with respect to the tires 67, and 68 and ridged portions 66 provide friction between the tire and the cleats substantially to prevent slippage. Aperture 58 provides an area through which mud, clumps of dirt and snow may fall, thereby preventing an accumulation of such materials inside the cleat. Ridges 59 and 60 provide good traction for cleats 55 in relation to the ground surface or snow, and yet provide a relatively small area of contact with the ground or other surface when the tractor is turned. By having such a small area of contact, the disturbance of the earth or other surface is minimized upon turning the tractor.

Wings 62 of cleats 55 give a broad spread to the cleats, and at the same time afford protection to the cable holders 63. Cable holders 63 have bevelled ends 63a as shown in FIG. 12 to permit adjoining cleats to fit closely when passing over the periphery of the tractor tire. Cable holders 63 are easily secured to wings 62 and tire guides 61 by welding and provide a simple means for threading the cable 64 through them.

The ends of cable 64 are attached in conventional manner to permit easy disattachment when necessary. Thus cleats may be removed or added as desired. Also, longer or shorter cables may be used depending upon the wheel base required for the particular job. The wheel base can be readily shortened or lengthened by the adjustment of set screw 46 against push plate 52 in relation to the length of the track cable 64.

In the operation of the tractor, gasoline motor 81 drives the master hydraulic pump 87 by pump shaft 85. The speed and horsepower of the gasoline motor 81 may be increased or decreased as needed. Hydraulic fluid is furnished to the master hydraulic pump from tank 131. The hydraulic fluid is pumped to fluid speed control 90 through tubing 89. The fluid speed control regulates the speed of the flow of fluid which, in turn, regulates the speed of the wheels operated by the hydraulic system. Preferably, a fluid speed control with at least 10 settings and intermediate settings is desirable for my tractor.

The fluid flows from fluid speed control 90 to fluid divider 93 through tubing 92. The fluid divider 93 provides for an equal supply of fluid for the individual hydraulic system of each of the rear tractor wheels 35 and 36. The fluid flows from the flow divider 93 to the respective pump ports 96 and 97 through tubing 94 and 95.

The flow of the fluid for operation of the respective tractor wheels 35 and 36 is controlled by dual master controls 100 and 101, respectively, which regulate operation of the respective fluid pumps 98 and 99.

Thus, when the dual master controls 100 and 101 are both in upright position as shown in FIG. 1, they are in neutral position and the rear wheels are stationary. When both master controls 100 and 101 are pushed forward an equal distance, the rear wheels 35 and 36 travel forward at the same speed and the tractor goes straight forward. When master control 100 is pushed forward, fluid pump 98 forces fluid through tubing 106 which activates fluid motor 110, causing shaft 116 to turn, thereby causing wheel 35 to turn forward through gearwheels 122 and 126 and chains 120 and 128. The fluid is returned to fluid pump 98 through tubing 107.

When master control 100 is pulled rearwardly, the flow of the fluid is reversed from that above described, causing the wheel 35 to turn in a reverse direction. In other words, the fluid flows from fluid pump 98 through tubing 107 to fluid motor 110 which causes shaft 116 to turn in reverse so that wheel 35 also turns in reverse. The fluid returns from fluid motor pump 110 to fluid pump 98 through tubing 106. The fluid which is returned to pumps 98 and 99 from fluid motors 110 and 115, respectively, is directed back to fluid tank 131 to be recirculated through the tractor hydraulic system.

The operation of wheel 36 is accomplished in the same manner by pushing master control 101 forward causing fluid pump 99 to force fluid through tubing 111, activating fluid motor 115 which causes shaft 117 to turn so that wheel 36 will be rotated forwardly by gearwheels 119 and 127 and chains 121 and 129. The fluid returns from fluid motor 115 to fluid pump 99 through tubing 112.

Likewise, wheel 36 revolves in a reverse direction when master control 101 is pulled rearwardly, as the direction of the flow of the fluid is reversed to flow from fluid pump 99 through tubing 114 and fluid motor 115 forces shaft 117 to revolve in a reverse direction.

When dual master controls 100 and 101 are both pulled backward, an equal distance, the tractor will move straight backward. It should be further noted that in addition to speed control resulting from the speed of the gasoline motor 81, and provided by the fluid speed control 90, the operator may also regulate the speed of the tractor by his use of master controls 100 and 101 and the extent to which he moves them forward or backward, if fluid pumps 98 and 99 are provided with means for metering the fluid flow therethrough.

The steering of the tractor, whether with endless tracks or with the tricycle front wheel, is thus performed by use of the dual master controls 100 and 101. For example, a turn of approximately one-half of the radius can be made to the left by pulling master control 100 backward and pushing master control 101 forward approximately the same distance from neutral position. Various other angles of turning may be accomplished, as desired, by proper manipulation of master controls 100 and 101. It is a feature of my invention that each rear wheel is subject to completely independent operation from the other with the use of a single master hydraulic pump 87.

The tractor may be provided with conventional hydraulic brakes, by connection with the above-described hydraulic system.

It must be understood that the tractor has many other uses than those above-mentioned, both as an endless track type tractor and as a three-wheel tractor. Of course, the gear-ratios may be modified to meet practically any specific requirements.

The location of the fuel tank 130 at the forward end of the tractor and the extension of the fluid tank forwardly provides adequate ballast at the front end of the tractor. The tractor may be substantially compacted without extended oil lines, if desired.

It is to be understood that the present invention is not confined to the particular construction and arrangement of parts herein illustrated, but embraces all such modifications and alterations thereof, as may come within the scope of the following claims.

I claim:

1. An endless track type tractor which is convertible to a tricycle type tractor comprising, a frame, a driver wheel connected to each side of the rear portion of said frame, motor means carried by said frame for operation of said wheels, a slidable removable axle member attached to each side of the forward end of said frame, a forward wheel revolvably mounted to each said axle member, an endless track secured over the respective front and rear wheels on each side of the frame, means secured to said frame for forcing said axle member forwardly to maintain said track substantially taut between said respective front and rear wheels when used as an endless track type tractor, means for loosening the said track to permit removal of the track and removal of the front wheels, means for pivotally connecting said tricycle type wheel to the front of a frame for use when said track and said other front wheels are removed from the tractor.

2. The invention of claim 1 wherein the means for forcing the axle member forwardly to maintain the track substantially taut, and the means for loosening the said track to permit removal of the track and front wheels, are the same means.

3. The invention of claim 1 wherein the said wheels of the endless track type tractor carry rubber tires.

4. The invention of claim 1 wherein the said track is comprised of individual cleats secured together by a cable.

References Cited in the file of this patent

UNITED STATES PATENTS

| | | |
|---|---|---|
| 1,389,010 | Putnam | Aug. 30, 1921 |
| 1,870,632 | Kennedy | Aug. 9, 1932 |
| 2,402,042 | Haushalter | June 11, 1946 |
| 2,446,242 | Orshansky | Aug. 3, 1948 |
| 2,698,667 | Kropp | Jan. 4, 1955 |
| 2,761,268 | Johnson | Sept. 4, 1956 |
| 2,770,894 | Gettleman | Nov. 20, 1956 |
| 2,845,308 | Woltemar | July 29, 1958 |
| 2,855,059 | Sutherland | Oct. 7, 1958 |
| 2,909,378 | Borchers | Oct. 20, 1959 |
| 2,925,873 | Laporte | Feb. 23, 1960 |